H. Levasseur.
Globe Valve.
Nº 98,171. Patented Dec. 21, 1869.
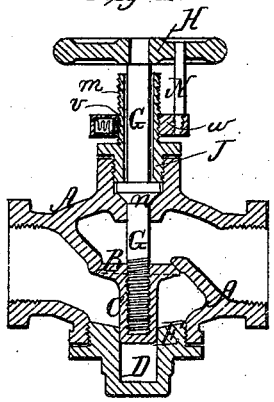
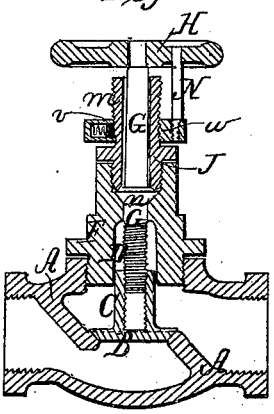
Witnesses:
John J. Schillinger
Louis Stumm
Inventor:
Hippolite Levasseur

United States Patent Office.

HIPPOLITE LEVASSEUR, OF BROOKLYN, NEW YORK.

Letters Patent No. 98,171, dated December 21, 1869.

GLOBE-VALVE.

The Schedule referred to in these Letters Patent and making part of the same.

*To all whom it may concern:*

Be it known that I, HIPPOLITE LEVASSEUR, of Brooklyn, in the county of Kings, in the State of New York, have invented certain Improvements in "Steam-Valves," of which the following is a specification.

The first part of my invention relates to the arrangement of an inclined part on the valve-stem, fitting into a corresponding part of the valve-shell, in combination with the lower part of the gland, whereby a self-tightening packing for the valve-stem is obtained, the object of which is to dispense with all other description of packing, and at the same time to reduce the friction.

The second part of my invention relates to the combination of a pin or projection with the gland, or with a projection on said gland, and with the hand-wheel or lever, which operates the valve, whereby the exact amount of opening of the valve can readily be seen.

In the accompanying drawings—

Figure I represents a longitudinal section of a steam-valve embodying my invention.

Figure II represents a section of a steam-valve, embodying my invention, with the valve differently arranged.

Similar letters represent similar parts.

A is the valve-shell, and

B, the valve, opening, in Fig. I, downward, and in Fig. II, upward.

To this valve a boss, C, is attached, made either square, or any other suitable shape, and fitting into a corresponding recess, D, either in the bottom plug E, as in Fig. I, or in the cover F, as in Fig. II, and whereby the valve is prevented from turning while being moved upward or downward.

Into this boss C, the valve-stem G screws, for the purpose of raising or lowering the valve.

On the valve-stem G, a collar, n, is provided, the lower part of which is made bevelling, and ground tight upon a corresponding seat in the top of the valve-shell, as in Fig. I, or in the cover F, as in Fig. II.

Upon this collar n, the gland J is screwed, the lower end of which is made bevelling, fitting into a corresponding recess in the upper side of the collar n, and forming, thus, a perfectly tight joint or packing, when in its place, without the use of any other packing-material.

To the top of the gland J, a projecting tube, m, is fastened, or forms a part of the same, having, on its outside, a screw-thread cut, upon which a nut or collar, w, is fitted to work freely.

Into this nut or collar w, a pin, N, is securely fastened, entering a hole in the wheel H, or in the handle, fast on the top of the stem G, and through which the valve is operated.

In the nut or collar w, a small clutch-piece, v, is inserted, acted upon by a spring on its back, or by a set-screw, to lock this nut or collar w against the tube m, in any position, and prevent, thereby, the valve-stem G, and consequently the valve, from moving, as this nut or collar w is, through the pin N, connected with the wheel H fast to the stem.

When the valve is opened, the nut or collar w moves upward, upon the screw-thread, on the projecting tube m, attached to the gland J, through the pin N, which connects said collar w with the wheel H, and as the latter remains always in the same place, this pin N will project gradually above the surface of the wheel, indicating, thereby, the exact amount the valve has been opened.

Instead of the nut or collar w working upon the thread cut in the tube m, and operating the pin N, as above described, a square thread may be cut on said tube m, and a square head, made on the end of the pin N, to operate in this square screw-thread.

What I claim as my invention, and desire to secure by Letters Patent, is—

1. The construction of the valve-stem G, with a collar, n, fitting into a corresponding seat, in combination with the gland J, acting upon the top of said collar n, operating together in the manner and for the purpose described.

2. The arrangement and use of the pin N, operated through its collar w, or its equivalent, by a screw-thread, cut upon a projecting tube fast to the stationary gland J, and passing through the handle or wheel H, which operates the valve, the whole being combined and operating in the manner and for the purpose specified.

3. The friction-clutch v, in the nut or collar w, acted upon by a spring or set-screw, and operating in the manner and for the purpose set forth.

HIPPOLITE LEVASSEUR.

Witnesses:
JOHN J. SCHILLINGER,
LOUIS STUMM.